United States Patent [19]

Bötz et al.

[11] Patent Number: 4,531,419
[45] Date of Patent: Jul. 30, 1985

[54] SERVO MECHANISM, ESPECIALLY FOR INTENSIFYING THE BRAKING POWER IN A MOTOR VEHICLE

[75] Inventors: Jakob Bötz, Ingersheim; Erich Mutschler; Hans Prohaska, both of Bietigheim-Bissingen; Eckhardt Schmid, Brackenheim; Wolfgang Scholl, Gemmrigheim, all of Fed. Rep. of Germany

[73] Assignee: ITT Industries, Inc., New York, N.Y.

[21] Appl. No.: 294,998

[22] Filed: Aug. 21, 1981

[30] Foreign Application Priority Data

Aug. 22, 1980 [DE] Fed. Rep. of Germany ....... 3031643

[51] Int. Cl.³ .............. F16H 35/00; B60T 11/00; F16B 7/00
[52] U.S. Cl. .............. 74/388 PS; 74/388 R; 60/545; 188/360
[58] Field of Search ............ 74/388 R, 388 PS; 188/358, 359, 360; 60/545

[56] References Cited

U.S. PATENT DOCUMENTS

| 2,318,756 | 5/1943 | Chouings | 188/359 |
| 2,833,154 | 5/1958 | Barnes et al. | 74/388 R |
| 2,972,902 | 2/1961 | Rockwell | 74/388 PS |
| 3,140,619 | 7/1964 | Miller | 74/388 R |
| 4,109,529 | 8/1978 | Niklaus | 74/388 R |
| 4,140,351 | 2/1979 | Nogami | 60/545 |
| 4,143,514 | 3/1979 | Leiber | 60/545 |
| 4,224,832 | 9/1980 | Prohaska et al. | 74/388 R |

Primary Examiner—Lawrence J. Staab
Assistant Examiner—Michael David Bednarek
Attorney, Agent, or Firm—Donald J. Lenkszus

[57] ABSTRACT

To provide a power brake having relatively small hysteresis between brake pedal pressure and brake hose pressure and with compact construction, the push rod leading from the brake pedal to the brake master cylinder is divided into an input rod and an output rod. A pressure sensitive element is disposed between the rods and is displacable therewith. The pressure-sensitive element determines the force with which the servo member acts upon the output rod.

26 Claims, 20 Drawing Figures

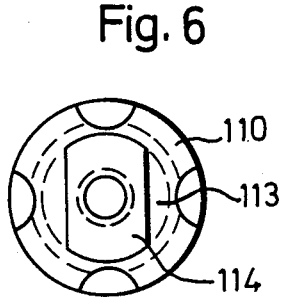
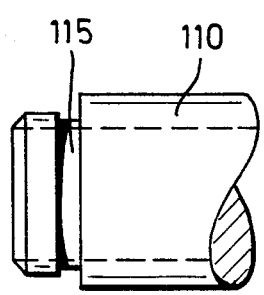
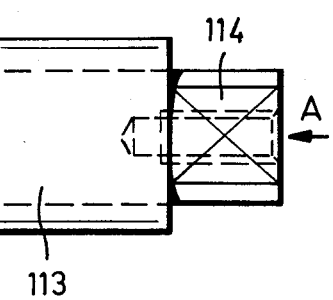
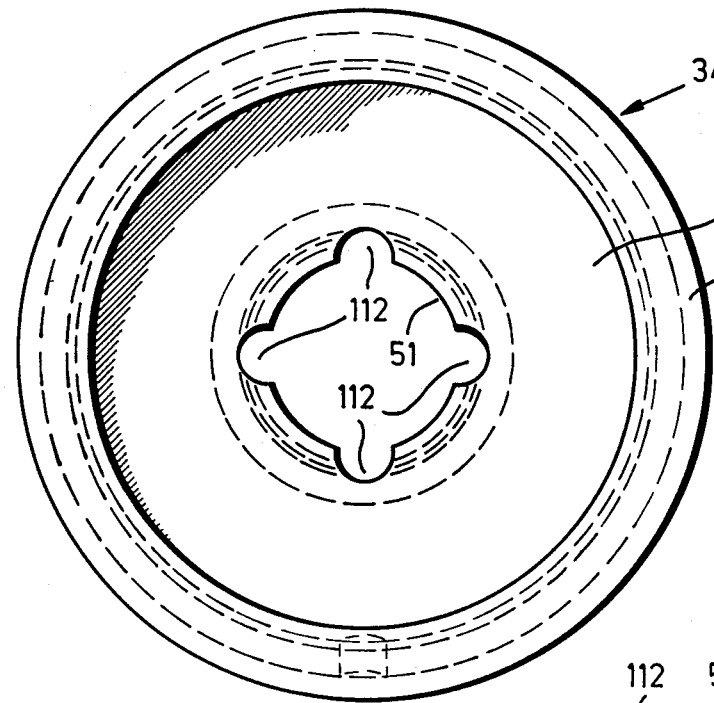
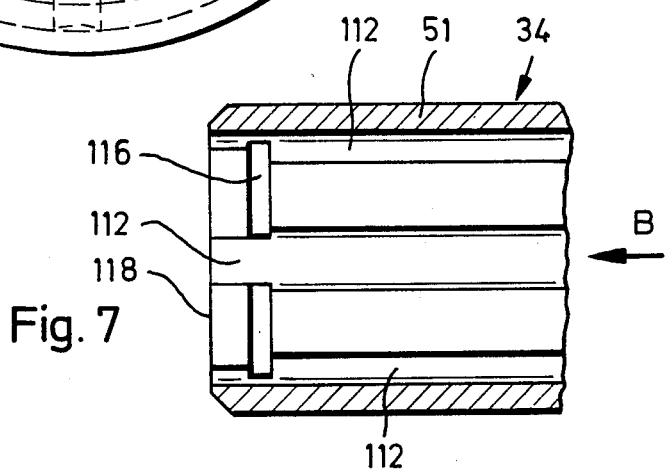

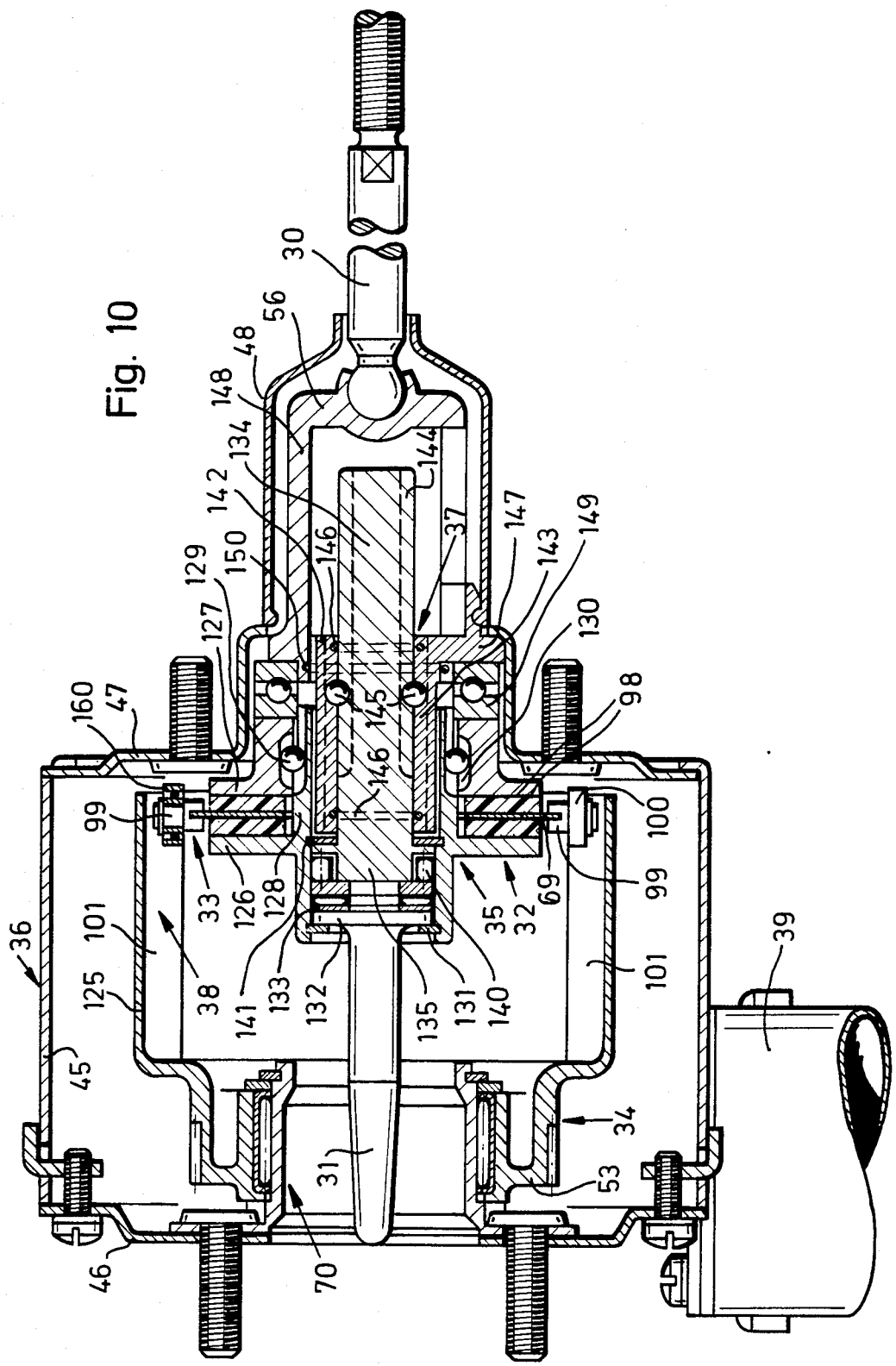

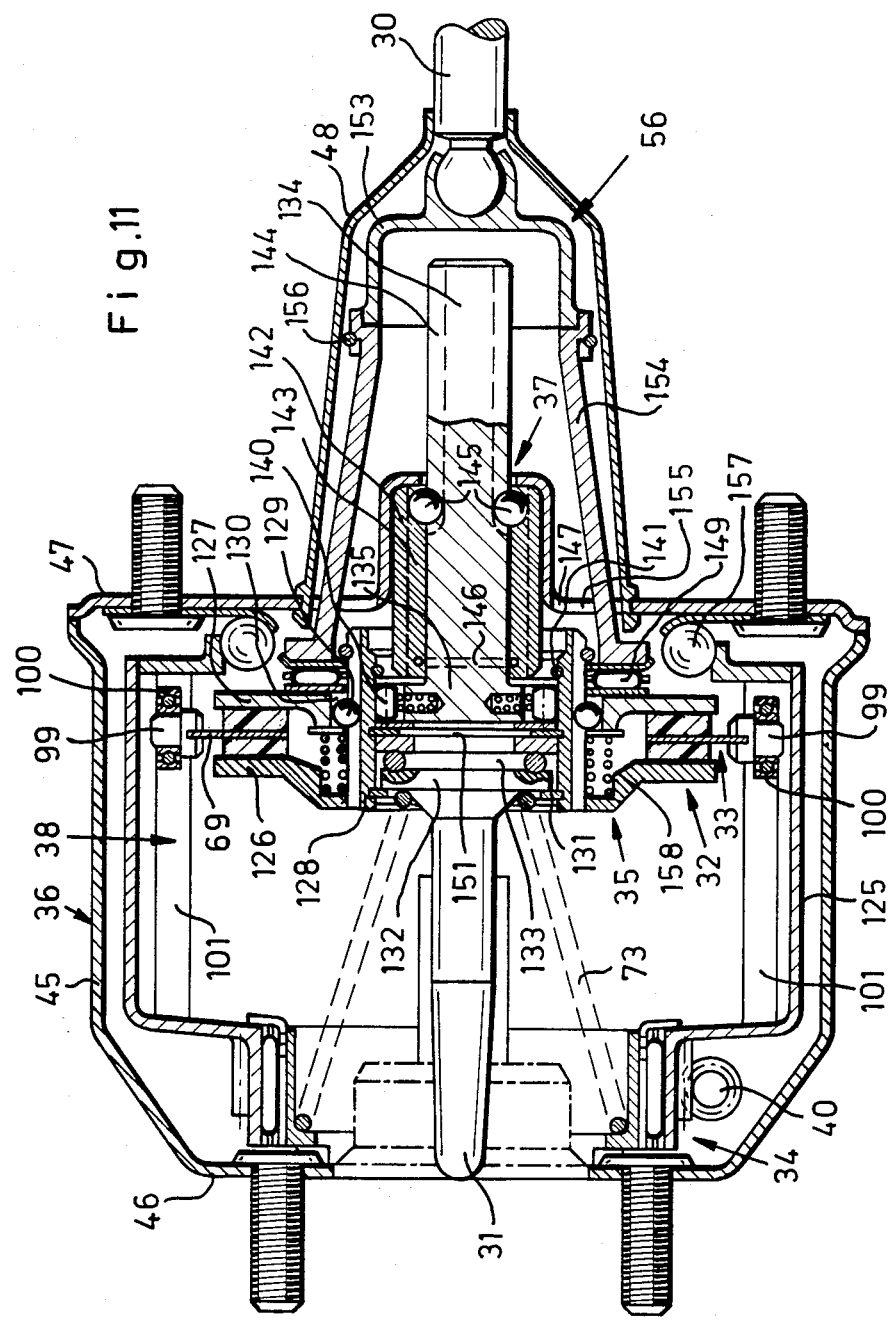

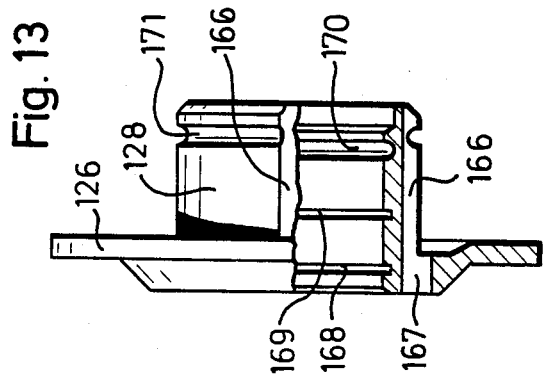
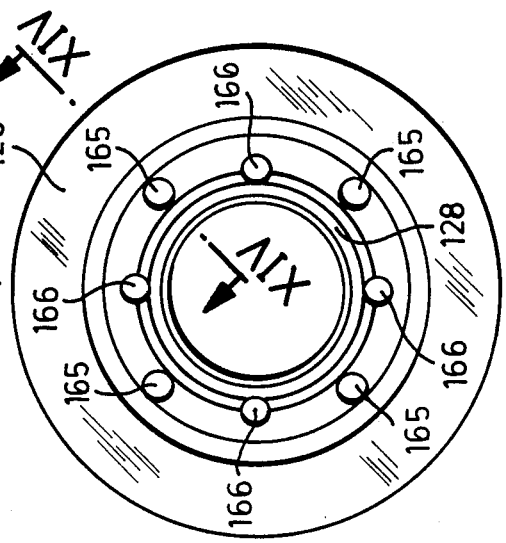
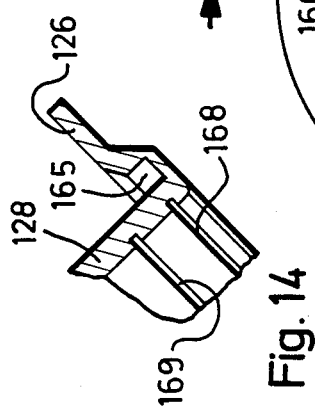

4,531,419

SERVO MECHANISM, ESPECIALLY FOR INTENSIFYING THE BRAKING POWER IN A MOTOR VEHICLE

BACKGROUND OF THE INVENTION

This invention pertains to a servo mechanism for intensifying the braking power of a motor vehicle.

Presently so-called servo brake systems are being installed in nearly all motor vehicles. These servo brake systems intensify the pressure exerted on the brake pedal by the driver to a sufficiently high brake pressure. The auxiliary power necessary for this purpose is gained from diverse systems. For instance there are hydraulic power brakes for the operation of which a pump for the fluid has to be available. In other cases the vacuum in the intake manifold of the motor is utilized. However, vacuum assisted systems are not easily utilized in vehicles with fuel injection.

From DE-OS No. 27 58 644 a brake unit is known, in which an electric motor serves as an accessory drive. Via a friction clutch and an overrunning clutch the electric motor drives a pinion serving as a servo member. The pinion mates with a push rod partly formed as a rack which leads from the brake pedal to the brake master cylinder. The friction clutch may be regarded as a pressure-sensitive element. The greater the pressure which presses the two clutch halves together, the greater is the torque which can be transmitted to the servo member via the clutch, and the larger is the counterforce against which the push rod can still be adjusted. If at a given value of the frictional connection between the two clutch halves this counterforce is exceeded by a certain amount, there occurs a clutch slippage and the push rod is not further adjusted.

The support axes of the servo member, of the clutch disks and the motor shaft of the known device extend vertically to the push rod. The consequence is that the clutch can only be controlled from the brake pedal via a complicated lever power transmission which requires significant space. During braking big transverse forces appear in the bearing of the pinion and in one clutch half which result in significant bearing-friction. This bearing-friction is also noticeable, when by increasing the pressure exerted onto the brake pedal, the pinion and the one clutch disk are somewhat displaced in axial direction. Because of the bearing-frictions which appear in the lever system, an extremely high hysteresis between brake line pressure and brake pedal pressure is created.

SUMMARY OF THE INVENTION

Starting from the prior art mentioned the invention is based on the problem of providing an improved servo mechanism in which the brake line pressure quickly follows the brake pedal pressure and in a compact design. The servo mechanism is not to exceed the size of vacuum intensifiers presently used.

This problem is solved according to the invention by a servo mechanism in which the push rod has an input and an output rod co-axially positioned towards each other, in which the pressure-sensitive element is arranged between input rod and output rod and this is displaceable and in which the servo member acts upon the output rod.

By arranging the pressure-sensitive element between input and output rod this element can in a simple manner be acted upon by pressure on the brake pedal, because a counterforce acts on the output rod. The pressure on the pressure-sensitive element can also be maintained, when output rod and input rod are adjusted, because the pressure-sensitive element can be displaced with them. In a servo mechanism according to the invention, it is not necessary to provide a complicated lever power transmission and therefore the space required is considerably reduced. This also contributes to a reduction of the hysteresis between brake line pressure and brake pedal pressure. Additionally, to increase the pressure on the pressure-sensitive element no parts on which high transverse forces are acting have to be displaced in axial direction.

Having the servo member supported co-axially to the output rod is especially favorable with regard to its spatial arrangement and with respect to a low bearing friction. The support axis of the servo member is in line with the direction into which the output rod has be be displaced and into which the force has to act on the output rod. Having the driven wheel of the accessory drive formed as a hollow cylinder within which the output rod extends contributes to a compact design. Because one can reduce the rotational speed to a small number of revolutions this driven wheel may have a big diameter. Thus, the interpenetrative arrangement of output rod and driven wheel does not cause an enlargement of the servo mechanism in a direction transverse to the output rod, but in the longitudinal direction of the output rod which accordingly makes the mechanism very short.

In accordance with an embodiment of the invention the rotation of the rotating driven wheel is transformed into an axial displacement of the output rod via a screw joint and a push joint. Such a design is generally called a worm gear. Thereby the necessary transformation of motion can be effected on a small space. One of the two parts interconnected by a screw joint is normally stationary in the axial direction, whereas the other has a component of motion in the axial direction. Therefore counterforce to the axially directed force for moving the one part has to be absorbed by the other part. Further in accordance with the invention, stationary part of the two parts interconnected by the screw joint may be directly connected with a structural part to be acted upon by the output rod. This design has the particular advantage in that the entire servo power is directly applied to the structural part acted upon by the output rod. The structural part to be acted upon by the output rod can for instance be the brake master cylinder of a brake system.

When the screw joint is arranged between the driven wheel and a further part and the push joint is arranged between the housing and the further part, the servo mechanism has only a few rotating parts. Under certain circumstances only the output of the driven wheel executes a rotary movement. Because the input rod and the output rod are only moved in an axial direction without undergoing a rotary movement only a small number of rotating parts are necessary. The number of bearing between parts being fixed in a rotational direction and parts moving in a rotational direction is small.

Further in accordance with the invention, an overruning clutch can advantageously be realized in the screw joint. An overruning clutch is provided in a servo mechanism according to the invention to permit adjustment of input and output rods for the braking of a motor vehicle when the motor-driven accessory drive is blocked. If for instance the motor vehicle engine is used as an accessory drive, braking should also be possible in case the engine is idle. Braking should also be possible if an electric motor is used as an accessory drive and its current supply is interrupted, because the ignition has been switched off or a defect with regard to the electric or mechanical function has appeared.

In another embodiment of the invention, the screw joint can also be realized without a thread and without a roller or slide body. The screw motion between the two parts connected by the joint is effected in the following manner: if the two parts would execute a pure rotational motion relative towards each other the spacing between the two moving joints of the connecting element on both parts would vary. However, the connecting element does not allow such a change. Under the additional condition that the spacing between the moving joints must remain the same the two parts can therefore only be rotated towards each other, if they also move relative towards each other in axial direction. This results in a screw motion in which there is a non-linear correlation between the angle by which the two parts connected by the screw joint are twisted against each other and the distance covered in axial direction. For this reason the amplification of the servo mechanism is not constant. Depending on what is required the joint can be developed in such a way that the amplification is increased or reduced in accordance with the adjustment of the output rod. The most favorable condition might be that the amplification increases with increasing adjustment of the output rod. For a brake system the pressure required for slight braking is mainly provided via the brake pedal. Only if the braking becomes stronger does the power assist of the servo mechanism become noticeable, and increasingly so. A conventional roller screw joint can be developed in a non-linear manner.

If the connecting element, be it a rigid rod or a flexible rope, is subject to tensile strain, an overrunning clutch can be integrated in the screw joint. A flexible connecting element, e.g. a rope, can fold when the two parts connected by the screw joint have to execute a purely axial movement towards each other. If a rigid rod is used the overrunning clutch is achieved in that according to claim 14 the two moving joints of the rod in the condition of the biggest possible axial spacing from each other are in axial direction at least nearly in alignment and that at least one moving joint is developed as a passage for the rod. But if the screw is developed in such a way that the rods are subject to tensile strain, an overrunning clutch can be achieved according to claim 16 in that a guide groove originates from at least one moving joint of each rod, in which guide groove the rod is captivated.

Further in accordance with the invention, the pressure-sensitive element may be a non-positive friction clutch co-axially arranged to the push rod. This clutch comprises two halves movable against each other. One half is articulated to the driven wheel of the servo motor and rotatably mounted. The other half is articulated to the housing. Thereby, the second clutch half can be acted upon by the input rod. Depending on whether the screw joint is positioned between the driven wheel and the first clutch half and the push joint is positioned between the second clutch half and the housing or vice versa, upon actuation of the clutch by exerting a pressure on the input rod the first clutch half is braked by the second clutch half or the second clutch half is carried along by the first clutch half. The first case has the advantage that no relative rotary movement takes place between the second clutch half and the input rod, so that a rolling bearing between the second clutch half and the input rod is not needed.

Other embodiments of the invention utilize a friction clutch. The difficulties in articulating the driven wheel to the first clutch half and coupling it with the auxiliary motor are overcome by providing the driven wheel with two portions positioned on behind the other in axial direction. The driven wheel is coupled with the servo motor on one portion and on the other portion carries a part of the joint between itself and the first clutch half is a screw joint then as far as the thread is concerned, the torque predetermined by the non-positive connection of the friction clutch and the force to be transmitted in axial direction is inversely proportional to the radius and to the tangent of the angle of inclination of the thread. If the radius is reduced, the axial force is larger. Because the axial force must, however, not exceed a given value the smaller radius can be compensated by a bigger angle. Thus, one can provide an angle of 45° which has the greatest power transmission efficiency, if one disregards the friction.

Further, in accordance with one aspect of the invention, a small and compact design of the servo mechanism may be achieved by locating each friction lining of the friction clutch radially outside of the second portion of the driven wheel between a flange of the first clutch half and a flange of the second clutch half. Then the second clutch half may be formed as a bell which at least partly covers the driven wheel and the first clutch half.

If the push joint is located between the driven wheel and the first clutch half, both the link joint between the driven wheel and the first clutch half and the coupling between the first clutch half and the output rod are realized in a simple manner.

A servo mechanism in which the coupling between the two clutch disks is provided with the friction linings outside of the driven wheel can, under certain circumstances, involve difficulties with respect to the design, because some connection must be effected between the friction linings arranged outside of the driven wheel and the output rod extending within the driven wheel. It can therefore be more favorable to arrange in addition to the output rod also the friction linings and the friction disks or the entire clutch in the interior of the driven wheel resulting in a symmetrical arrangement as in another embodiment of the invention. Upon actuation of the clutch the one clutch half is therefore only exposed to small forces.

In yet another embodiment, the screw joint is located between the second clutch half and the housing with the radius of the thread of the screw joint as small as possible. The structural part of the second clutch half is articulated to the structural part fixed on the housing in at least one direction of rotation and is connected with a friction disk of the second clutch half in a manner protected against twisting and in axial direction adjusts each clutch disk and the output rod. This facilitates the production of the piece parts of the second clutch half. With the separate structural part connected with a clutch disk of the second clutch half in a manner protected against twisting in at least one direction of rotation, an overrunning clutch can be inserted between the separate structural part and the corresponding clutch disk. This overrunning clutch permits the separate structural part to rotate relative to the housing without taking along the clutch disks, when the brake is operated without power assistance. In order to provide that the separate structural part is easily rotatable relative to the housing the one clutch disk of the second clutch half directly acts upon the output rod independently of the separate structural part.

Other embodiments of the invention avoid the use of a friction clutch, which is subject to wear. These other embodiments are based on the principle of controlling an electric motor by means of the pressure exerted by the driver's foot. For this purpose the pressure-sensitive element is a sensor which serves as a transmitter for an electronic circuit controlling an electric motor in such a way that the torque created is proportional to the pressure measured by the sensor, and that the driven wheel of the motor is at least in one direction of rotation continuously and directly operatively connected to the output rod by a joint. A screw joint is advantageously positioned between the output of the motor and the output rod and a push joint between the output rod and the housing. By this arrangement it is provided that the output rod does not carry out a rotational motion without any rolling bearings. The armature of the motor only rotates so far at a time until the counterforce and the feeding power created by the torque are equal. If the pressure on the input rod is eased, the motor is controlled via the electronic circuit with a lower voltage. When the input rod and the output rod are reset, the armature of the motor is rotated in the opposite direction. In order to be able to brake quickly and without additional resistance, when the electric motor is defective, an overrunning clutch can be built in between the motor and the joint between the output of the motor and the output rod. Advantageously the rotor of the electric motor may be directly used as an output. Such a design is of simple construction and small size.

BRIEF DESCRIPTION OF THE DRAWINGS

Several servo mechanism versions in accordance with the invention are shown in the accompanying drawing, in which like reference numerals designate like parts and in which:

FIG. 5 is a lateral view of the stud which is somewhat modified in comparison to that of FIG. 4;

FIG. 6 is a view of the stud of FIG. 5 in direction of arrow A;

FIG. 7 is a section through part of the driven wheel which is somewhat modified in comparison to that of FIG. 4;

FIG. 8 is a view of the complete driven wheel in direction of arrow B in FIG. 7;

FIG. 10 is a fifth embodiment of a servo mechanism according to the invention with all clutch members arranged within the hollow driven wheel;

FIG. 11 is a sixth embodiment similar to that of FIG. 10;

FIG. 12 is a view of a clutch disk of the second clutch half of FIG. 11;

FIG. 13 is a clutch disk of FIG. 12 partially in a section taken on the line XIII—XIII in FIG. 12 shown partially in lateral view;

FIG. 14 is a section taken along the line XIV—XIV of FIG. 12;

DETAILED DESCRIPTION

The terms "push joint" and "screw joint" or variations thereof are used herein. It will be understood by those skilled in the art that the term "screw joint" refers to a coupling between two elements such that rotary motion of one element results in a relative axial displacement of the other element. It will also be understood by those skilled in the art that the term "push joint" refers to a coupling between two elements such that relative movement between the two elements can only occur in a lateral or axial direction, however, both elements may jointly exhibit rotary movement relative to a third element. In accordance with the invention, a screw joint and a push joint are both used such that lateral or axial movement of an input rod is combined with rotary movement of a motor driven wheel to produce an axial movement of an output rod.

Figure 4:
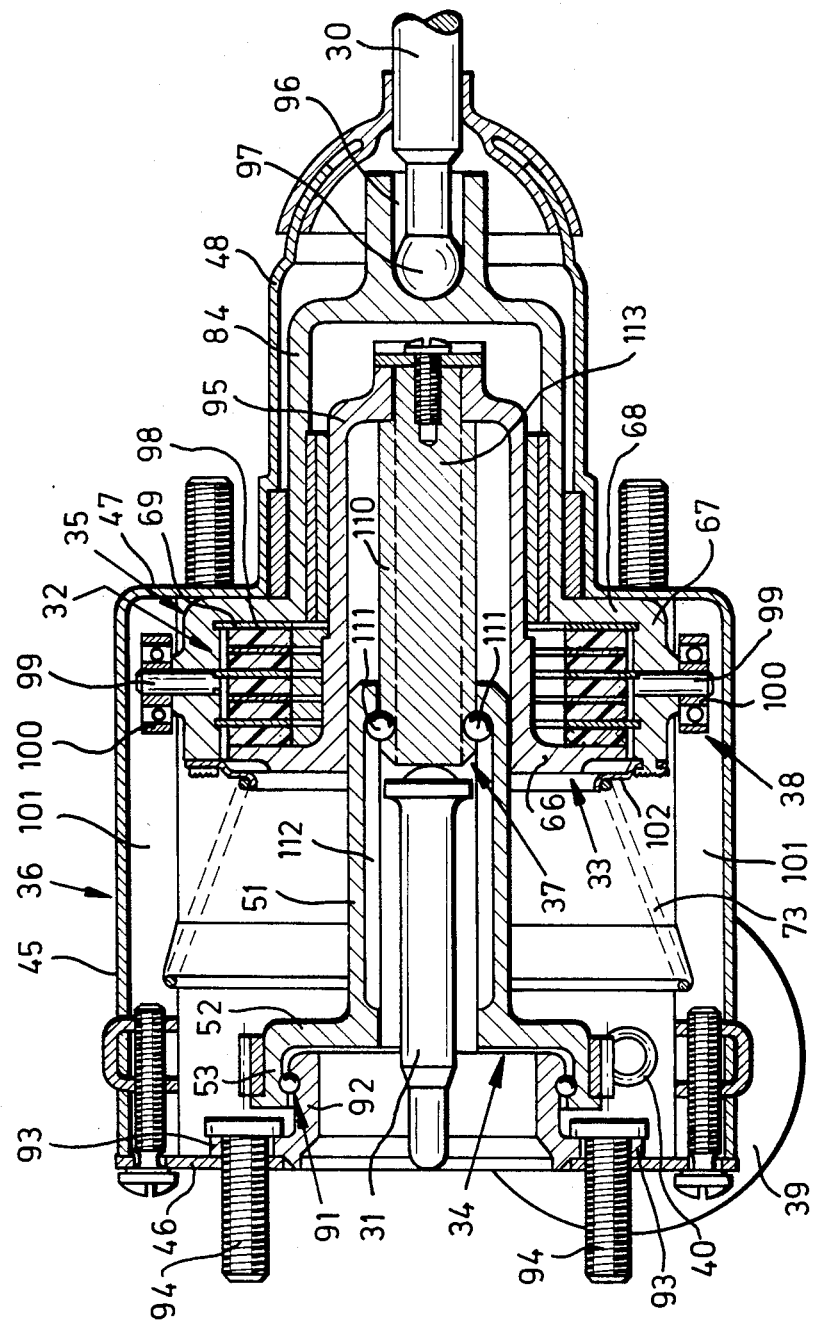
FIG. 4 is a version similar to that of FIG. 3, in which the first clutch half grips with a stud into the interior of the driven wheel and is there articulated to the driven wheel.

One example of a push joint utilized in one embodiment of the invention shown in FIG. 4 is a one or more radially extending tongue like portion carried on one element which engages one or more corresponding laterally or axially extending grooves on a second element.

The servo mechanisms shown in the Figures serving as power brakes have an input rod 30 which can be connected with a brake pedal and an output rod 31 which can act upon the piston of a brake master cylinder. So the necessary force for adjusting the output rod 31 does not have to be entirely supplied via the brake pedal during braking, an additional force created by a motor-driven accessory drive is conducted onto the output rod 31. A friction clutch 32 is provided for initiating the servo power of the power brakes according to FIGS. 1 to 17. The first clutch half of clutch 32, namely the driving part, is articulated to the driven wheel 34 of the motor-driven accessory drive. The second clutch half 35, i.e., the driven part, is articulated to the housing 36. The rotational movement of the driven wheel 34 is transformed into an axial movement of the output rod 31 via a screw joint 37 between the driven wheel 34 and the first clutch half 33 and via a push joint between the second clutch half 35 and the housing. It should be noted that instead of the screw joint a push joint can be used and vice versa. In the versions shown the motor-driven accessory drive is provided by an electric motor 39 whose rotational speed is reduced by means of the worm shaft 40 and by the driven wheel 34 developed as a worm wheel.

The housing 36 is cup-shaped with a sidewall or jacket 45 and an end wall 46. A face plate 47 is provided opposite end walls 46. The face plate 47 includes a central cavity 48 having a smaller diameter than the jacket 45.

Figure 1:
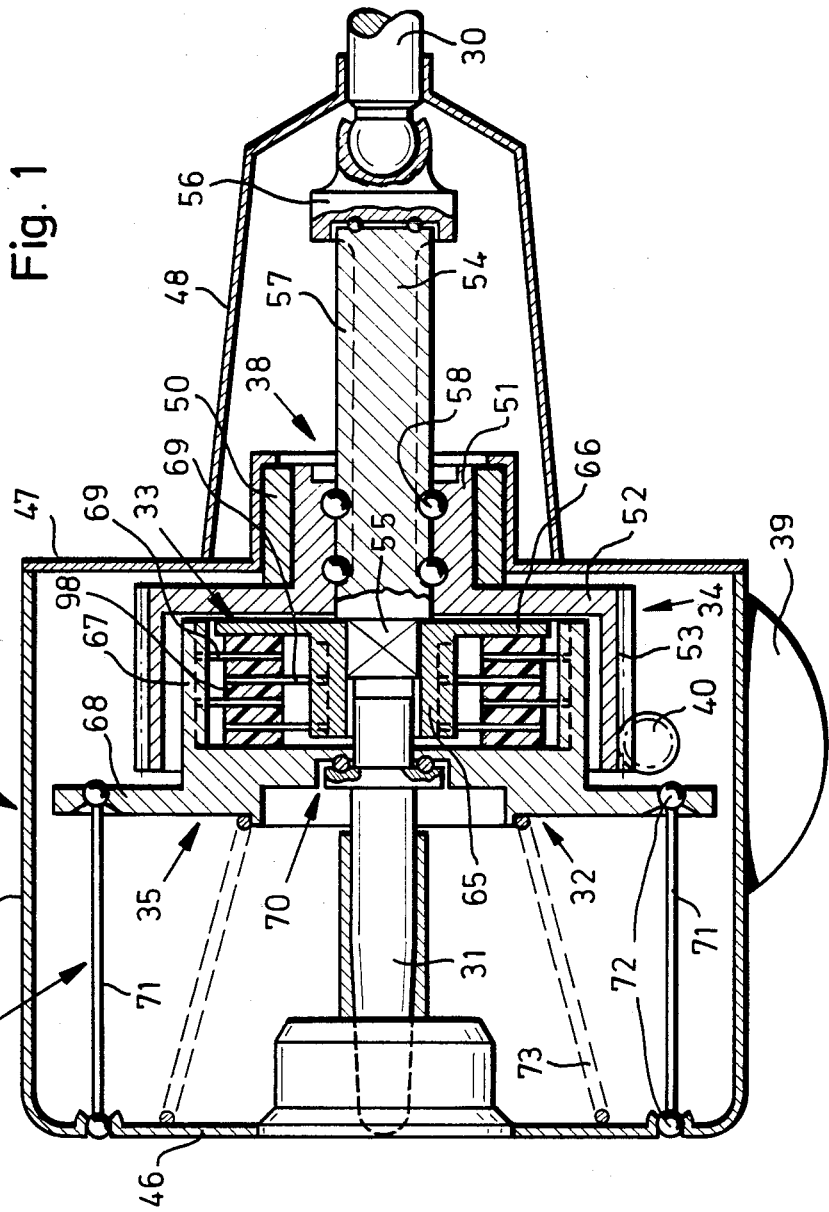
FIG. 1 is a first embodiment of a servo mechanism according to the invention having a screw joint between the second clutch half and the housing provided by rigid connecting elements which are subject to tensile strain.

In the power brake unit of FIG. 1 the driven wheel 34 is rotatably mounted in a slide bearing 50. The slide bearing 50 is held on face plate 47. The driven wheel is formed as a bushing 51. On the side of the bushing 51 pointing to the interior of the housing is a flange 52. A hollow cylinder 53 projects from the outer rim of flange 52. Toothing is formed on the outer surface of cylinder 53. A pressing rod 54 extends through the bushing 51 of the driven wheel 34. One end portion 55 of the rod 54 is of square cross-section. The other end is connected with the input rod 30 via an intermediary member 56. Between intermediary member 56 and pressing rod 54 there are ball bearings. The connection between intermediary 56 and input rod 30 is provided by a ball joint. The pressing rod 54 is provided with a total of four longitudinal groove 57 in which a total of eight balls 58 are projecting. The balls 58 are held in receptacles on the inside of the bushing 51. Thus, two balls 58 are each located in one longitudinal groove 57. By means of the longitudinal grooves 57 and the balls 58 are held in the bushing 51 a push joint is provided between the driven wheel 34 and the pressing rod 54. Thus, these parts can move relative to each other only in axial direction.

The clutch disk 66 of the first clutch half 33 includes a hub 65 for engaging square portion 55. The length and width of square portion 65 is smaller than the diameter of the cylindrical part of the pressing rod 54. The clutch disk 66 is surrounded by a hollow-cylindrical portion 67 of the clutch disk 68 of the second clutch half 35. There is a predetermined spacing between the disks 66 and 68. Several longitudinal grooves are provided on the inside of the portion 67 of the clutch disk 68 and on the outside of the hub 65 of the clutch disk 66. The grooves are distributed over 360°. Each clutch disk 66, 68 is coupled with two clutch plates 69 which overlap in the space between the two clutch disks. A friction lining 98 is arranged between two clutch plates 69 each and between each clutch disk and the neighboring clutch plate. Thus, the first clutch half 33, which together with the driven wheel 34 executes a rotary movement, is connected to the clutch half 35 in a non-positive manner. Therefore, the clutch disk 68 of the second clutch half 35 is rotated, which, due to the screw joint between it and the housing 36, is adjusted in axial direction as well. Clutch disk 68 serves as a servo member acts upon the output rod 31 moving rod 31 in axial direction. When the brake pedal is swivelled further, the first clutch half follows the movement of the second clutch half. Thus, the strength of the coupling is maintained. Finally, the counterforce on the output rod 31 becomes so great that the torque necessary to overcome this force can no longer be transmitted by the clutch because the frictional connection is to small. Then clutch slippage occurs. The driver obviously does not desire a stronger braking at the time being. Only a further swivelling of the brake pedal could strengthen the frictional connection between the two clutch halves, so that greater torque can be transmitted and the output rod 31 can be adjusted further.

If the electric motor of the servo mechanism shown in FIG. 1 should fail, braking can be effected with the power of the foot alone. The force acting on the brake pedal is transmitted to the output rod 31 via the input rod 30, the intermediary member 56, the pressing rod 54, the clutch disk 66, the clutch plates 69, the friction linings 98 and the clutch disk 68. An axial adjustment of the clutch disk 68 is made possible in that the rods 71 can penetrate the disk 68. Thus, an overrunning clutch in the screw joint between the clutch disk 68 and the housing 36 is provided in a simple manner.

When the braking process is terminated the clutch 32 and the pressing rod 54 are, with the help of pressure spring 73, again brought into the position shown. The output rod 31 is readjusted together with the piston of the master brake cylinder. Of course, the restoring force in the brake system also contributes to resetting of the clutch and of the pressing rod 54. However, this contribution is relatively small, because the restoring forces within the brake system are largely used up for resetting of other parts.

Figure 2:
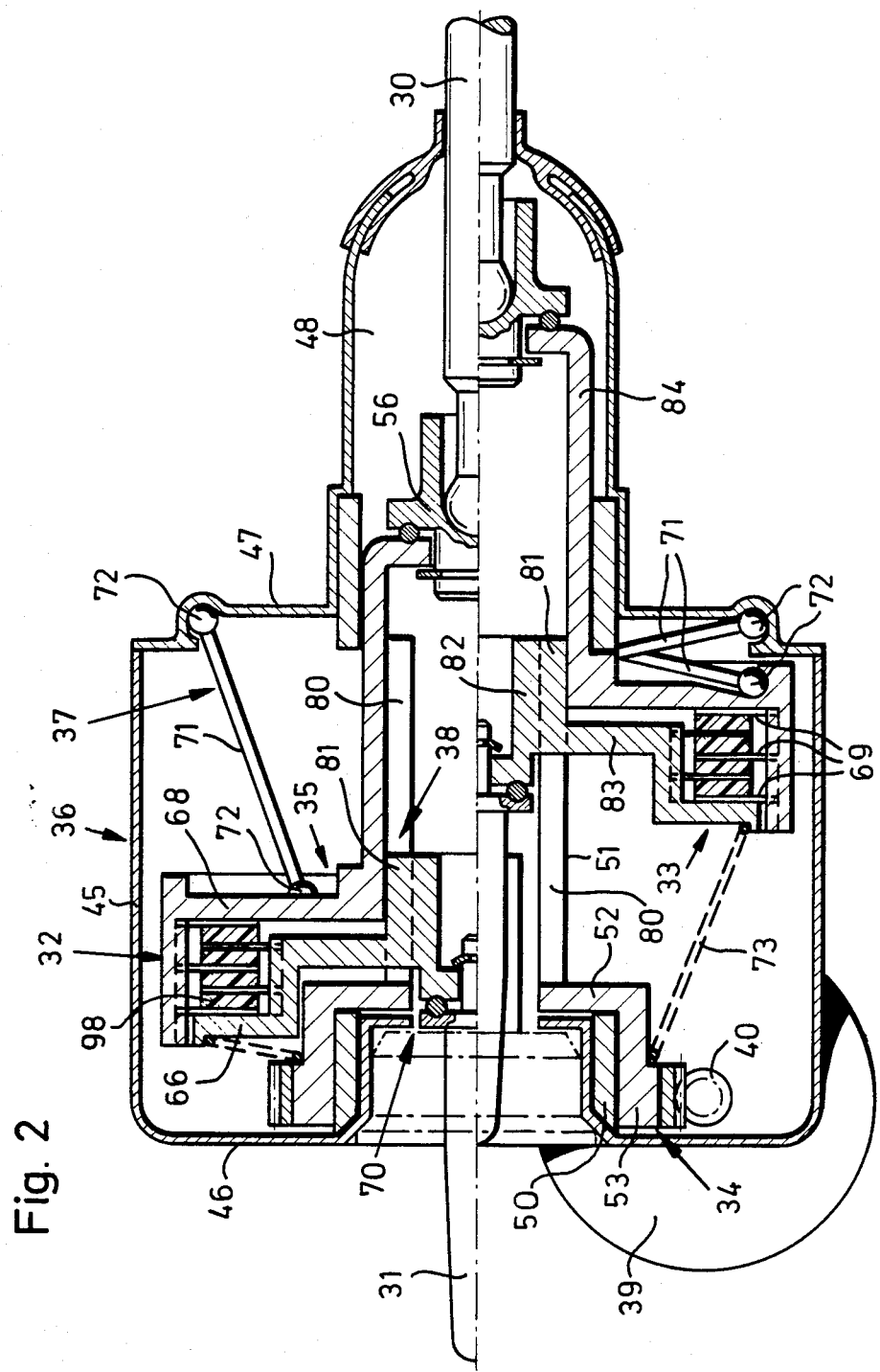
FIG. 2 is a version similar to that of FIG. 1, in which the rigid connection elements between the second clutch half and the housing are subject to compressive stress.

The power brake of FIG. 2 differs from that of FIG. 1 mainly by a reverse sequency of driven wheel 34, first clutch half 33 and second clutch half 35 in such a way that now the clutch disk 66 of the first clutch half 33 acts upon the output rod 31 and in that the rods 71 of the screw joint 37 between the clutch disk 68 of the second clutch half 35 and the housing 36 are subject to compressive stress. As in FIG. 1 the driven wheel 34 has two portions 51 and 53 in axial direction being located one behind the other, which portions are connected by a flange 52. But now, unlike to the example of FIG. 1, the driven wheel is supported on the slide bearing 50 by the hollow cylinder 53 which on its outside is provided with a toothing mating with the worm 40. Unlike FIG. 1 the slide bearing 50 is now located on the end wall 46 of the housing 36. Beginning at the flange 52 the bushing 51 traverses nearly the entire housing. Bushing 51 is provided with a total of four longitudinal slots 80, which are opposite to each other and extend to the flange 52. The clutch disk 66 of the first clutch half 33 has a total of four spokes 81, which are positioned in the longitudinal slots 80 and which interconnect the ring-shaped parts 82 and 83 inside and outside of the bush 51. Via the ball bearing 70 the clutch disk 66 acts upon the output rod 31 by means of the inner ring 82. A push joint is formed between the driven wheel 34 and the first clutch half 33 by the longitudinal slots 80 in the bush 51 and the spokes 81 guided therein.

In addition to the clutch disk 68 the second clutch half 35 has a bell portion 84 which is functionally comparable to the pressing rod 54 of FIG. 1 as it also makes the connection between a clutch disk and the input rod 30. Between the bell 84 and the input rod 30 is the intermediary member 56. The bell 84 overlaps the bushing 51 of the driven wheel 34 and, at its lower end, widens flange-like to the outside of the clutch disk 68. The clutch plates 69 and the friction linings 98 are arranged between the clutch disks 66 and 68 as in FIG. 1.

In contrast to the structure of FIG. 1, the rods 71 with the balls 72 on their ends extend between the clutch disk 68 and the front 47 of the housing 36. During a braking process the rods 71 press the entire clutch and the output rod towards the brake master cylinder. Thereby, the clutch disk 66 represents the servo member acting upon the output rod 31. As FIG. 2 shows, in the lower part of which the servo mechanism is shown in the rest condition and in the upper part in the condition of full braking, the two moving joints of a pressing rod 71 on the clutch disk 68 and on the front 47 of the housing 36 are not in alignment in the condition of full braking. This feature of design ensures that the coupling 32 and the intermediary member 56 can without difficulties be reset by the pressure spring 73, when the brake pedal is released.

In order to ensure that in the version according to FIG. 2 the braking can also be effected, when the electric motor 39 fails, it is provided that at least one guide groove originates from a moving joint of each pressing rod 71, in which guide groove the rod 71 is captured. These guide grooves are not shown in FIG. 2. There can be a guide groove on only one moving joint of each pressing rod. It is however, possible to provide guide grooves on both moving joints. These guide grooves do not impair the servo assistance in anyway, because the pressing rods can support on the end of each groove. When the servo assistance is blocked, the respective ball 72 can be drawn away from the supporting end of a groove.

Because the force exerted by the connection rods 71 in axial direction is greater with a larger angle of inclination towards the clutch disk 68, the assistance of the power brake according to FIG. 2 is greatest, when the greatest brake effort is required. This is the non-linearity of the screw joint 37 of FIG. 2 might be more advantageous than that of the screw joint 37 of FIG. 1.

Also the readjusting spring 73 of FIG. 2 is arranged differently that that of the example according to FIG. 1. The readjusting spring of FIG. 1 is supported with its one end on a stationary part, namely on the front wall 46 of the housing 36, and with its other end on a rotating part, namely on the clutch disk 68, and the spring is thereby twisted. The readjusting spring 73 of the embodiment according to FIG. 2 rests against the clutch disk 66 of the first clutch half 33. Thus, the two ends of spring 73 in the embodiment of FIG. 2 rotate synchronously.

Figure 3:
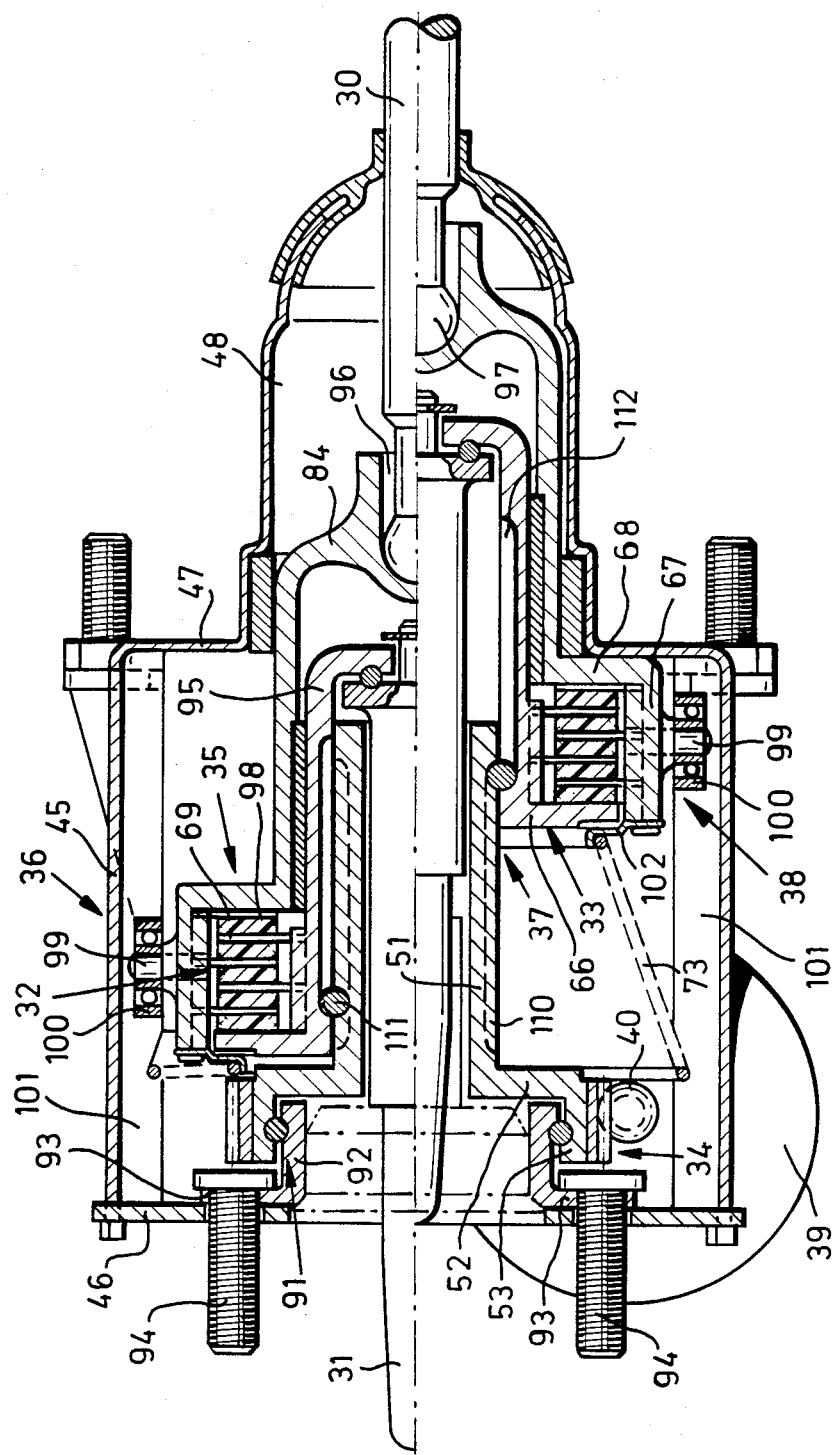
FIG. 3 is a servo mechanism according to the invention comprising a screw joint between the driven wheel of the auxiliary motor and the first clutch half and a push joint between the second clutch half and the housing.

In comparison to the servo mechanisms of FIGS. 1 and 2, the sequency of screw joint 37 and push joint 38 is reversed in the embodiments of FIGS. 3 and 4, if one regards the driven wheel 34 as the starting point. The screw joint 37 is located between the driven wheel 34 and the first clutch half 33. The push joint 38 is arranged between the second clutch half 35 and the housing 36. Because the second clutch half 35 does not carry out a rotary movement, it can be coupled without an intermediary member directly with the input rod 30.

As in the embodiment according to FIG. 2, the driven wheel 34 is supported in the area of the front face 46 and is arranged in the same manner with the portions 51, 52 and 53. At the bushing 51 the driven wheel 34 is connected with the first clutch half 33 via the screw joint 37. Because of this screw joint a force to the right acts upon the driven wheel 34 when the clutch 32 and the output rod 31 are displaced to the left, and the driven wheel has to be stably supported in right-hand direction. This support is provided by a ball bearing 91, which also acts as a radial bearing and as axial bearing for the hollow cylinder 53. The inner ring 92 of the ball bearing 91 lies with two flange-like outwardly directed eyes 93 between the heads of the two screws 94 and the front wall 46 of the housing through which the screws 94 project to the outside. When the brake system is mounted, the brake master cylinder and the housing 36 of the servo mechanism are coupled by these screws. The force which seeks to draw the driven wheel 34 to the right directly acts upon the screws 94 and thereby on the brake master cylinder. The result is the housing 36 is relieved of this force.

The first clutch half 33 has a bell 95 which surrounds the bushing 51 of the driven wheel 34. At the open end of the bell 95 not facing the input rod 30 there is the flange-like outwardly directed clutch disk 66. Over the bell 95 of the first clutch half 33 the bell 84 of the second clutch half 35 is positioned. A universal ball joint 96 receives the ball-shaped end 97 of the input rod 30. The clutch disk 68 is again formed by an outward flange at the open end of the bell 84. In a hollow-cylindrical portion 67 of clutch disk 68 clutch plates 69 are inserted between which the friction linings 98 are positioned. The package of clutch plates 69 and friction linings 98 is acted upon by the clutch disks 66 and 68.

In two places diametrically opposed to each other two pins 99 are fastened on the portion 67 of the second clutch half. Pins 99 are pointing in radial direction. On each pin 99 the inner ring of a ball bearing 100 is firmly seated. The ball bearing 100 is guided in a longitudinal groove 101 of the housing 46. The longitudinal grooves 101 and the ball bearings 100 provide the push joint 38 between the second clutch half 35 and the housing 36. The push joint 38 functions as a rocker joint.

The readjusting spring 73 is supported in the two versions of FIGS. 3 and 4 at its one end on the housing 36 and at its other end on a ring-shaped sheet 102 which is riveted to the front side of the hollow-cylindrical portion 67 of the second clutch half 35 and which projects inwardly below the side of the clutch disk 66 not facing the friction linings. Twisting of the spring 73 is avoided because the housing 36 and the second clutch half 35 are interconnected by a push joint. When a braking operation is terminated the readjusting of the first clutch half is ensured simultaneously, because the sheet 102 and the clutch disk 66 overlap.

The two power brakes of FIGS. 3 and 4 differ primarily in the design of the screw joint between the driven wheel 34 and the first clutch half 33. In the example of FIG. 3 and the bushing 51 of the driven wheel is provided with a quadruple thread on its outside surface. In each thread a ball 111 is located as a connecting element. Half of each ball projects over the outer surface of the bushing 51 and grips in one of four longitudinal grooves 112 on the inside of the bell 95 of the first clutch half 33. Each pair of the four longitudinal grooves 112 are diametrically opposed to each other.

In the power brake according to FIG. 4, the second clutch half includes a stud 113 projecting into the interior of the bushing 51 of the driven wheel 34. Stud 113 is connected to the end of the bell 95 and extends within the bell 95 towards the clutch disk 66. The outer surface of the stud 113 is developed as a quadruple thread 110, having an angle of inclination of 45°. The longitudinal grooves 112 are located on the inner side of the bushing 51. Again half of each ball is located in a thread 110 and the other half in a longitudinal groove 112. Unlike FIG. 3 the output rod 31 is not acted upon by the end of the bell 95, but by the front end of the stud 113. By moving the screw joint into the interior of the bushing 51 the radius of the thread 110 is smaller that that of the version according to FIG. 3. Thus, the angle of inclination may be increased to 45°. This is an angle of inclination with a very good power transmission efficiency factor.

When the brake pedal is actuated the electric motor 39 is switched on via a switch on the pedal, so that the driven wheel 34 is put into a rotary movement. If the pressure exerted by the brake pedal is very low, the first clutch half 33 is taken along by the driven wheel via the screw joint 37. Because of the low pressure the friction linings 98, the clutch plates 69 and the clutch disks 66 and 68 can move towards each other with very low friction. If the pressure initiated by the brake pedal is increased, then the two clutch halves 33 and 35 are coupled with each other. Thereby, the clutch half 35, which is static in direction of rotation, brake the first clutch half 33. This clutch half can no longer follow the rotary movement of the driven wheel 34, so that its movement receives a component in axial direction. Thus, the tappet stud 113 presses the output rod 31 towards the master brake cylinder. Thereby the force delivered by the servo mechanism adds to that which is initiated by the brake pedal. The readjustment of the various parts from the position shown in the upper half of FIG. 3 into the positions they occupy in FIG. 4 and in the lower half of FIG. 3 is effected via the conical pressure spring 73.

If the electric motor 39 fails completely the entire braking force must be generated by the brake pedal. For this reason longitudinal grooves 112 are provided in the bushing 51. The longitudinal grooves 112 are pushed over the four balls 111, so that it is possible to move the clutch 32 and the output rod 31.

If one exchanges the push joint 38 and the screw joint 37 with each other one obtains an alternative to the embodiments of FIGS. 3 and 4. So for instance one could develop the guides for the ball bearings 100 as threads, so that the screw joint is located between the housing 36 and the second clutch half 35. Because of the push joint only axial movement would then be possible between the driven wheel 34 and the first clutch half.

In FIGS. 5 to 9 some piece parts of the power brake assembly of FIG. 4 are shown separately. FIGS. 5 and 6 respectively show the tappet 113 in a lateral view and in a right-hand end view. The right end is screwed to the bell 95. The right end is designed as a pivot with cheeks 114 which can be inserted into an appropriately formed opening at the top surface of the bell 95, so that the connection between the bell 95 and the tappet 113 is protected against twisting. The diameter of the pivot with cheeks 114 is smaller than the diameter of bushing 51. Bushing 51 engages the bell 95 when it is inserted therein. Therefore, the balls 111 are captured between bushing 51 and the right-hand end of the tappet 113. An annular groove 115 is provided in which a locking ring is inserted at the other end. The four turns of the thread 110 can be seen in the view according to FIG. 6.

In FIGS. 7 and 8 which illustrate the driven member 34, the longitudinal grooves 112 are to be easily recognized. Grooves 113 have an approximately semicircular cross-section. FIG. 7 shows that the bushing 51 of the driven wheel 34 is provided with an annular groove 116 at a spacing from the end. From this annular groove 116 to the front side 118, the bushing 51 has a larger inside diameter than the portion on the other side of the annular groove 116. When one inserts the tappet 113 with the four balls 111 in the bushing 51, one can press a locking ring into the annular groove 116 because of the enlarged inside diameter between the tappet 113 and the bush 51. Thus the driven wheel 34 and the tappet 113 with the bell 95 are captured to each other.

Figure 9:
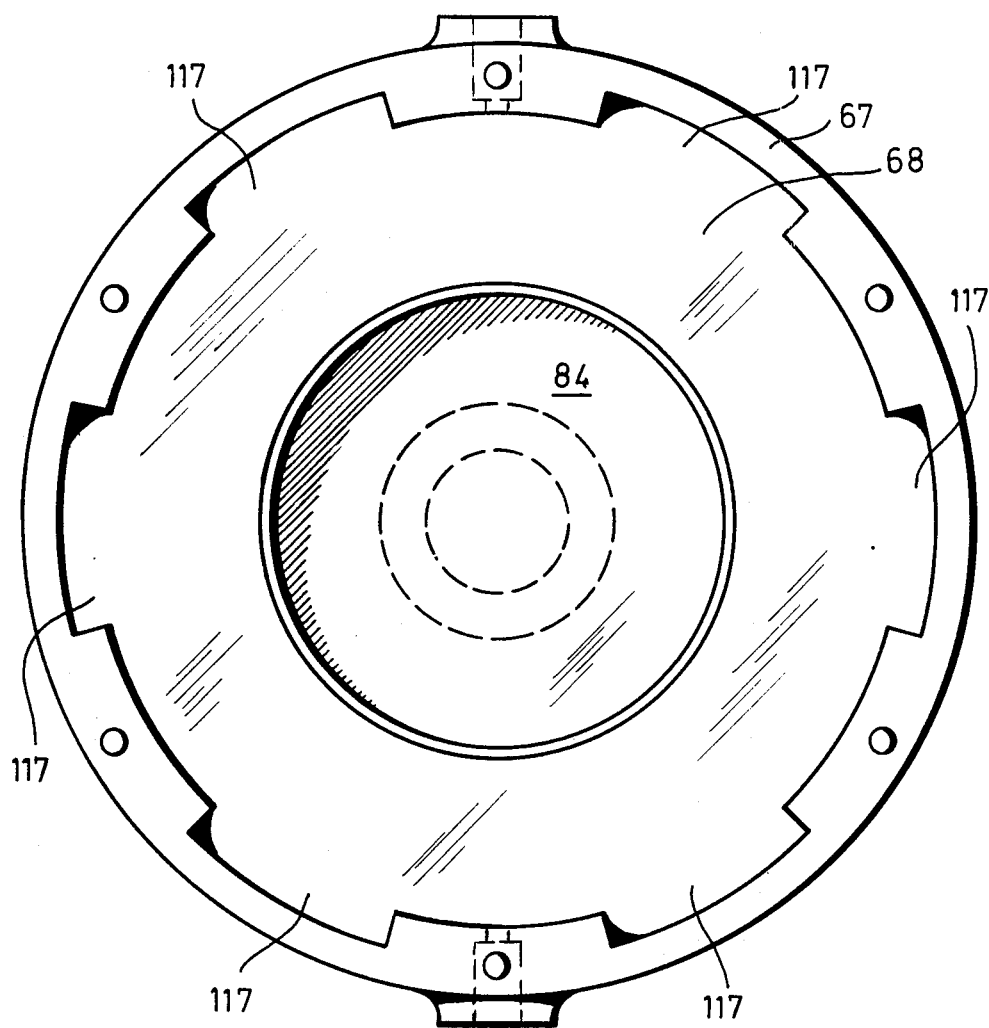
FIG. 9 is the bell-shaped second clutch half of FIG. 4 viewed towards the open side.

FIG. 9 shows a left end view of the bell 84 with the clutch disk 68 and the hollow-cylindrical portion 67. Clearly shown are the longitudinal grooves 117 in the hollow-cylindrical portion 67, into which the clutch plates 69, which are to be connected with the bell 84 in a manner protected against twisting, can be inserted and secured by outwardly directed studs. Thereby a protection against twisting and the axial movability is ensured.

FIGS. 10 and 11 show two embodiments of a power brake servo mechanism according to the invention in which the friction linings and the clutch disks are located within the hollow driven wheel 34. Driven wheel 34 has a first hollow-cylindrical portion 53 at which it is rotatably mounted on a rolling bearing 70 and carries a toothing. This first portion 53 is followed by a cup-like second portion 125 with an even bigger diameter, which portion extends nearly to the front side 47. In the area of the cup portion 125, the driven wheel 34 is coupled with the first clutch half 33 via the push joint 38. This first clutch half consists mainly of a ringshaped clutch plate 69 at whose outer pin several pins 99 are fastened on which the inner ring of a ball bearing 100 is seated. These ball bearings 100 are guided in longitudinal grooves 101 in the interior of the cup 125. Thus the push joint 38 between the driven wheel 34 and the first clutch half 33 is built up in the same manner as the push joint between the second clutch half 35 and the housing 36 in the embodiments of FIGS. 3 and 4.

In the versions according to FIGS. 10 and 11 the second clutch half 35 has two clutch disks 126 and 127 which each are provided with friction linings 98 resting against the clutch plate 69. The first clutch disk 126 is made in one piece with a hub 128 extending through the ringshaped clutch disk 127. Four balls 129, are each guided in a recess 130 formed by a groove on the outside of the hub 126 and on the inside of the clutch disk 127. With this arrangement, the two clutch disks are coupled to each other in a manner protected against twisting, but which permits movement in an axial direction.

In the embodiment of FIG. 10 the hub 128 of the clutch disk 126 is elongated beyond the side of the clutch disk 126 not facing the clutch disk 127. Starting from its end pointing to the front wall 46 of the housing 36 the following parts are arranged in the hollow interior of the hub 128: a locking ring 131 is located in an annular groove. Behind it follows a flange 132 at the rear end of the output rod 31. Thereafter, follows an axial needle bearing 133. Bearing 133 is acted upon a spindle 134. The left end of the spindle 134 is formed as a thread head 135 of an overrunning clutch. This overrunning clutch includes rollers 140 which are located between the thread head 135 and the hub 128. In an annular groove of the hub 128 a further locking ring is inserted behind the thread head 135. In the space between the spindle 134 and the hub 128, following the locking ring 141, there is a bushing 142 having an internal thread 143. Thread 143 has four turns as does the thread 144 of the spindle 134. Balls 145 couple both threads with each other. The balls 145 are secured within the bushing 142 by the two rings 146. The bushing 142 projects beyond the rear end of the hub 128 and is firmly connected with the housing by various extension arms 147 separated by intermediary spaces. Through these spaces the intermediary member 56 grips with various fingers 148. Intermediary member 56 acts upon the clutch disk 127 via an axial ball bearing 149 located between the clutch disk 127 and the extension arms 147. The intermediary member is captured by the locking ring 150.

The design of the second clutch half with the clutch disks 126 and 127 and the spindle 134 in the embodiment of FIG. 11 corresponds largely to that of FIG. 10. Therefore, only the differences are described. Between the axial rolling bearing 133 and the spindle 134 a pressure ring 151 is inserted in a groove of the hub 128. Thus, clutch disk 126 of the second clutch half 35 acts upon the output rod 31 independently of the spindle 134. The bushing 142 is held in a bulge on the front side 47 of the housing 36 and does not have extension arms. Again the connection between the input rod 30 and the clutch disk 127 is provided by a rolling bearing 149 via the intermediary member 56. In this embodiment, the member 56 is made in two pieces. It consists of a cap 153, which receives the input rod 30 in a socket and whose lower rim is provided with recesses, and of a finger member 154. Finger member 154 rests upon a rolling bearing 149 with a ring and grips through openings 155 in the front wall 47 of the housing 36 into the recesses at the cap 153 with various fingers separated from each other. The two parts 153 and 154 are firmly interconnected by the ring 156.

In the embodiment of FIG. 11 the driven wheel 34 at its end facing the front side 47 of the housing 36 is supported via a rolling bearing 157 both in the axial and in the radial direction. Pressure springs 158 are inserted in recesses of the clutch disk 126 and have the tendency to force apart the two clutch disks 126 and 127 of the second clutch half 35.

In FIGS. 12 to 17 parts of the embodiment of FIG. 11 are separately shown. In the views of the clutch disk 126 in FIGS. 12 and 14 are shown the recesses 165 for the pressure springs 158 and on the outer surface of the hub 128 is shown the longitudinal grooves 166 for the balls 129. Grooves 166 also penetrate the disk 126 as bores 167. In FIGS. 13 and 14 the annular groove 168 for receiving the locking ring 131 and the annular groove 169 for receiving the pressure ring 151 are shown. FIG. 13 shows a groove 170 on the inside of the hub 128 and a groove 171 on its outside. The annular groove 171 serves to receive the locking ring 141. The outer annular groove 171 receives a locking ring for the rolling bearing 139.

Figure 15:
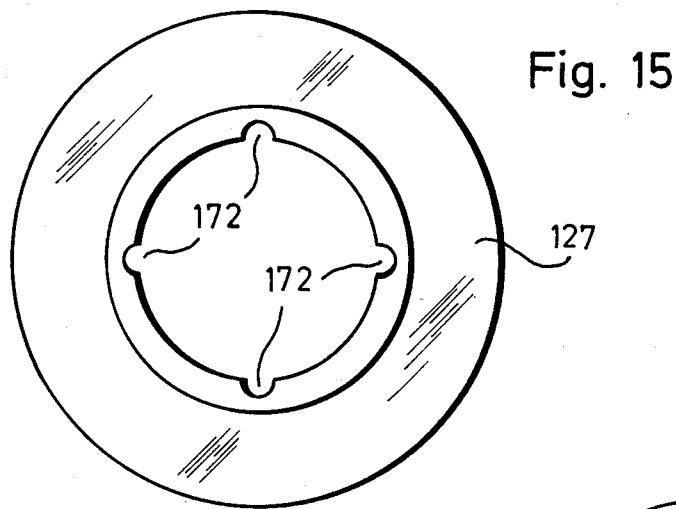
FIG. 15 is a top view on the second clutch disk of the second clutch half of FIG. 11.

In view of the clutch disk 127 shown in FIG. 15, the longitudinal grooves 172 are shown which are opposite the longitudinal grooves 166 on the hub 128 and together with grooves 166 form the recesses 130 for the balls 129.

Figure 16:
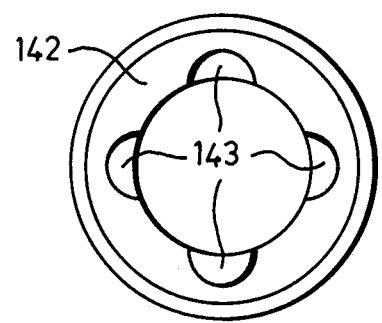
FIG. 16 is a top view on the bushing of FIG. 11 fixed to the housing and having an internal thread.

The view of the bushing 142 in FIG. 16 shows clearly the four turns of the thread 143.

Figure 17:
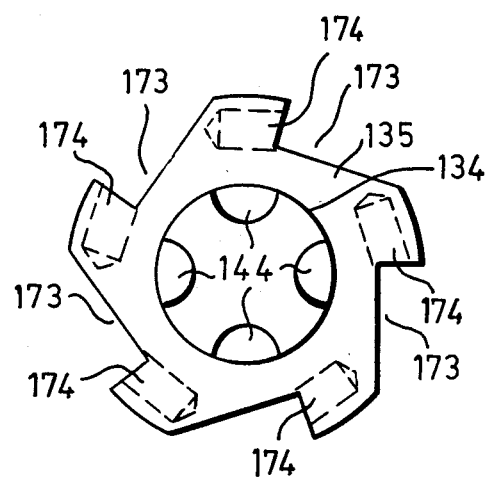
FIG. 17 is a top view of the spindle connected with the bushing via a screw joint.

FIG. 17 shows a view of the spindle from the direction of the input rod 30 showing the four turns of the thread 144 and the thread head 135 in the outer rim of which conical recesses 173 are brought in. In the bores 174 pressure springs are inserted which act upon the rolling bearing 140.

During a braking operation the movements of the apparatus of FIGS. 10 and 11 are similar to those of FIGS. 1 and 2. As soon as the brake pedal is operated the electric motor is switched on, which drives the driven wheel 34. The driven wheel 34 also starts a rotary movement of the first clutch half 33 with the clutch plate 69. When the pressure exerted by the brake pedal is great enough the clutch engages, so that the clutch plate 69 takes along the clutch disks 126 and 127. Via the overrunning clutch the spindle 134 is rotated which due to the screw joint between itself and the bushing 142 carries out a movement in axial direction. Thereby it also moves the clutch disk 126 and the output rod 31 to the left. The clutch plate 69, the clutch disk 127, the rolling bearing 149 as well as the intermediary member 56 and the input 30 are pushed into the same direction by the driver via the brake pedal. If the force exerted on the brake pedal is reduced the clutch 32 disengages and the pistons of the brake master cylinder can readjust all parts moved, by means of the readjusting spring 73. Because of the disengaged clutch the clutch disks 126 and 127 can assume a relaxed position together with the spindle 134 independently of the motional condition of the clutch plate 69.

If the electric motor blocks for any reason, in the structure of FIG. 10, the first initiated via the brake pedal is transmitted via the input rod 30, the intermediary member 56, the axial ball bearing 149, the clutch disk 127, the clutch plate 69, the clutch disk 126, the pressure ring 141, the spindle 134 and the axial needle bearing 133 to the output rod 31. Because the driven wheel 34 is thereby at rest, the clutch plate 69 can carry out no rotary movement nor can clutch disks 126 and 127 due to the frictional connection at the clutch. The spindle 134, however, can carry out a screw motion due to the overrunning clutch between itself and the clutch disk 126.

In the structure of FIG. 11 the power transmission is carried out in a similar manner as in FIG. 10. Because the pressure ring 151 is, however, arranged before the spindle 134 and the force is directly transmitted from the clutch disk 126 and the hub 128 via the pressure ring 151 to the output rod by circumventing the spindle 134. The friction between the rotating spindle 134 and the other parts, which are only moved in axial direction, becomes smaller. The screw motion of the spindle 134 can therefore easily be effected.

It is possible to design the power brake in such a way that the spindle 134 is at rest, when the braking is effected without servo assistance. This would, however, result in a much larger power brake. If the blocked motor becomes suddenly unblocked during a braking operation the spindle 134 would also hit the parts positioned before the thread head 135 with great velocity.

Figure 18:
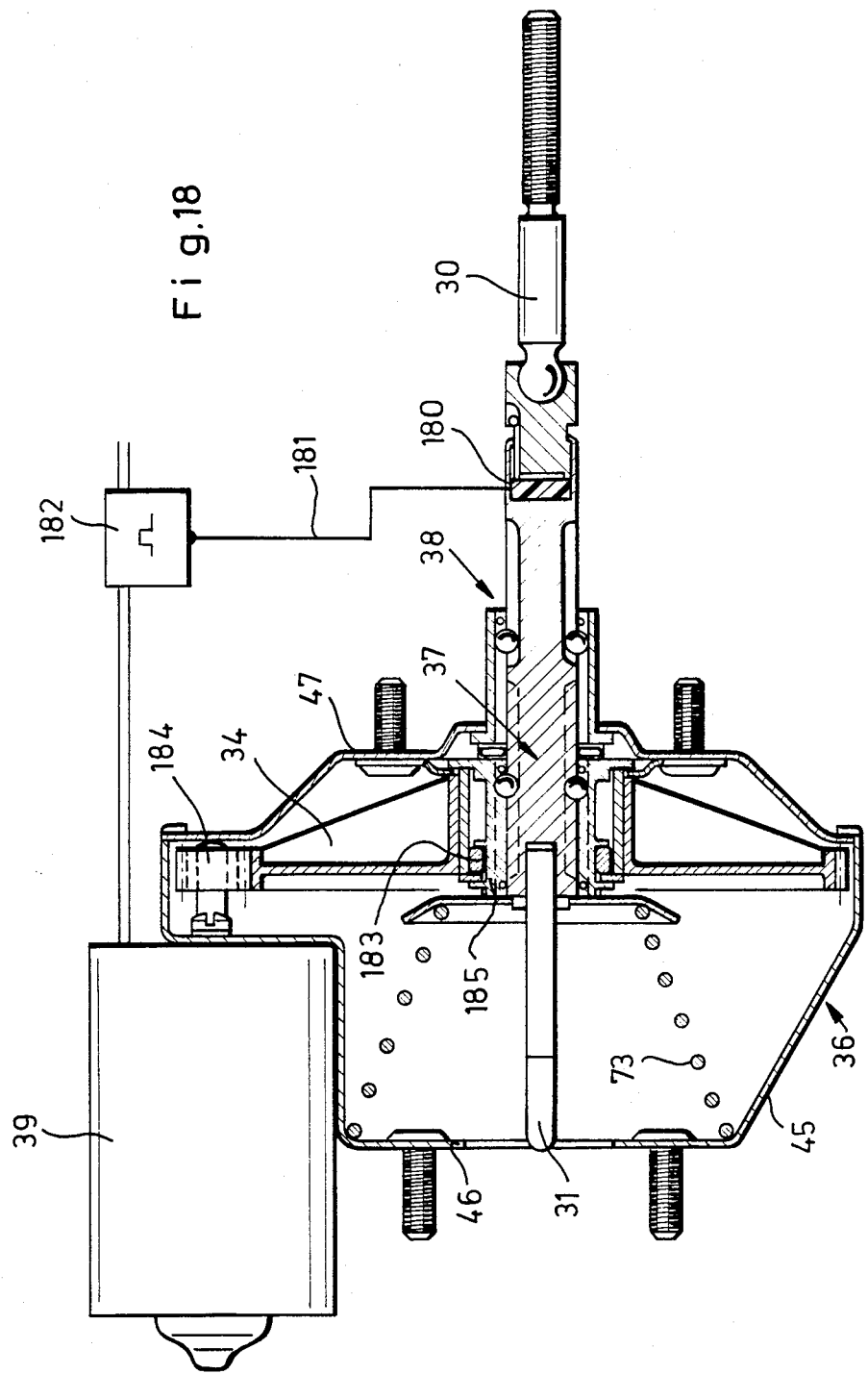
FIG. 18 is a servo mechanism according to the invention comprising a sensor as a pressure-sensitive element between input rod and output rod, whereby the sensor serves as a transmitter for the electronic control of an electric motor.
Figure 19:
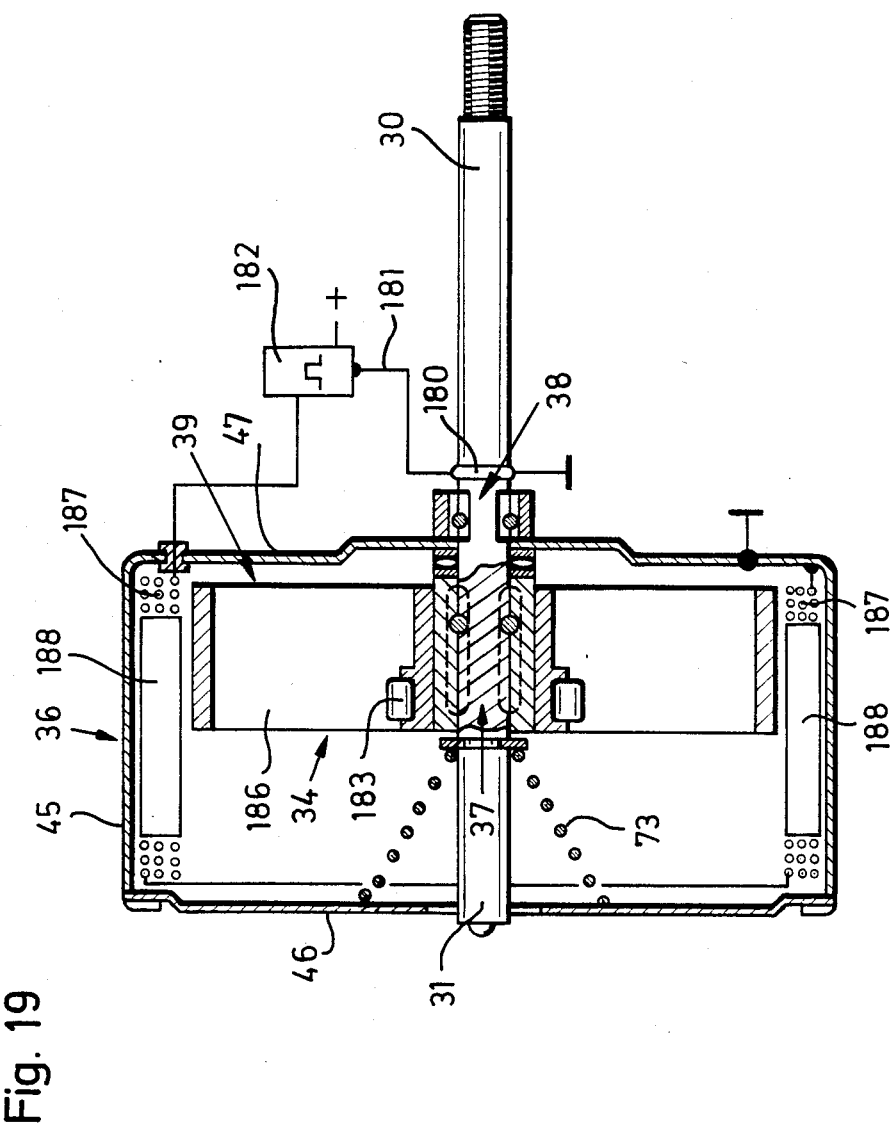
FIG. 19 is an embodiment in which the rotor of the electric motor is supported on the output rod onto which it is articulated.

The two power brakes according to FIGS. 18 and 19 have also a housing 36 with the jacket 45, the front side 46 and the front side 47. A pressure-sensitive element or sensor 180, is located between the input rod 31 and the output rod 30. The sensor can for instance be a wire strain gauge. The sensor 180 is connected to an electronic circuit 182 via a lead 181. Electronic circuit 182 controls the electric motor 39 in such a way that the torque generated at any time is proportional to the force of pressure measured by the sensor. The accessory drive unit 39 has a rotating output 34 connected to the output rod 30 via a screw joint 37. Between the output 34 and the output rod 30 an overrunning clutch 183 can be fitted. The rolling-push joint 38 between the output rod 30 and the housing 36 has the effect that the output rod can only move in axial direction. A rotary movement between the output rod and the housing is not possible.

In the structure of FIG. 18, a conventional electric motor is used on whose motor shaft a pinion 184 is seated. This pinion mates with the toothed wheel 34. If the brake pedal is now actuated, in accordance with the pressure received the sensor transmits a value to the electronic circuit 182, which supplies the motor 39 with a particular voltage. The pinion and with it the toothed wheel begin to rotate. Via the overrunning clutch 183 the bushing 185 is carried along too. At the inside of bushing 185 there is a thread of the screw joint 37. Because it is not possible to twist the output rod, the output rod is moved ahead. The counterforce rises until it finally reaches a value which is greater than the force which is generated by the brake pedal and the motor in the direction of adjusting. The motor therefore blocks and the output rod is not adjusted further. If the brake pedal is swivelled further, the sensor detects a higher pressure, the electronic circuit 182 would supply the motor with a higher voltage so that the wheel 34 could be rotated again and the output rod 30 could be axially adjusted. After termination of the braking operation the spring 73 readjusts the output rod 31. The wheel 34, the pinion 184 and the armature of the motor 39 must be able to rotate. Thus, the motor may not be self-locking. Even in case the motor fails, this means the entire braking force has to be provided via the brake pedal. It would be possible to adjust the output rod 30 without the overrunning clutch 183. The overrunning clutch is of advantage, because when the electric motor fails or the brake is operated very rapidly the braking can be effected without additional resistance.

In the structure of FIG. 19, the rotor of the electric motor is directly articulated to the output rod 31. Therefore, it represents the output 34. The rotor is permanent magnet 186. Diametrically opposed to each other, two coils 187 are fixed on the jacket 45 of the housing 36. A core of ferro-magnetic material is located in the interior of the coils. The coils are wound in such a way that the magnetic north of one coil points into the interior of the housing and the magnetic south of the other coild points into the interior. When the brake is not operated and the readjusting spring has brought the output rod into the position shown, the south pole of the permanent magnet 186 is located opposite the coil, which when energized generates a magnetic field with an inwardly directed south pole. The same is valid for the magnetic north of the permanent magnet 186 and the second coil. During a braking operation the coils 188 are supplied with a particular voltage depending on the force initiated by the brake pedal and further dependent on the pressure generated by said force and measured by the sensor 180. Therefore a torque acts on the permanent magnet 186, so that it rotates. This rotation leads to an axial adjustment of the output rod 31 via the screw joint 37 and the push joint 38.

Figure 20:
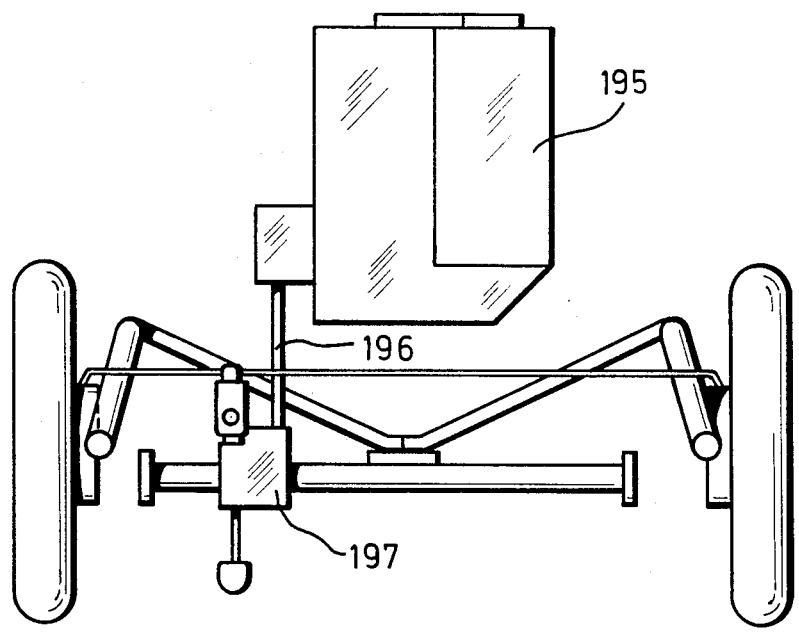
FIG. 20 is the arrangement of a power brake according to the invention in a motor vehicle, whereby the motor vehicle engine serves as accessory drive for the power brake.

FIG. 20 is a simplified section of a motor vehicle comprising the engine 195. This engine drives the power brake 197 via a connecting element 196; thus it serves as a motor-driven accessory drive. No auxiliary motor is necessary for the power brake. A flexible shaft, a multi-jointed shaft, a V-belt or another known technical element could be used as a connecting element 196 for transmission of motion.

We claim:
1. Servo-mechanism apparatus for use between brake means and brake activating means for providing power assisted braking of a vehicle, comprising:
a housing;
a motor driven accessory drive means having a rotary output;
a push rod supported in said housing and comprising an input rod coupleable to said brake activating means and being axially displaceable by said brake activating means along the longitudinal axis of said push rod, and an output rod coupleable to said brake means and being axially displaceable along said axis, said input rod and said output rod being in substantially coaxial alignment;
said drive means comprising a driven wheel formed as a hollow cylinder in coaxial alignment with said push rod and being driven by said rotary output to rotate about said longitudinal axis, said output rod extending into said cylinder;
a servo member supported in said housing coaxial to said push rod for transferring force from said driven wheel to said output rod, said servo member comprising a displaceable pressure sensitive means arranged between said input rod and said output rod for determining the force said servo member exerts on said push rod in response to force exerted on said input rod by said brake activating means, said pressure sensitive means comprising a first element coupled to said input rod and a second element coupled to said output rod, said servo member further comprising a first movable joint coupling said driven wheel to one of said first or second elements and a second movable joint coupling the other of said first or second elements to said housing;
one of said first or second movable joints comprising a screw joint permitting screw like motion about said axis between the parts connected therewith;
the other of said first or second joints comprising a push joint permitting only relative axial motion along said axis between the parts connected therewith.

2. Apparatus in accordance with claim 1, wherein said screw joint comprises:
a threaded coupling between said driven wheel and said first element.

3. Apparatus in accordance with claim 1, comprising:
thrust bearing means connectable to said brake means for supporting said driven wheel.

4. Apparatus in accordance with claim 1, wherein said first movable joint is screw joint coupling said driven wheel to said first element, and said second movable joint is said push joint.

5. Apparatus in accordance with claim 4, wherein said screw joint comprises a thread on one of said driven wheel or said first element, a longitudinal groove extending parallel to said axis on the other of said driven wheel on said first element, and a round body captured in said groove and engaging said thread.

6. Apparatus in accordance with claim 4, wherein said screw joint is nonlinear such that there is a nonlinear correlation between rotary motion of said driven wheel and axial displacement of said output rod.

7. Apparatus in accordance with claim 1, wherein said pressure sensitive element comprises a nonpositive friction clutch in coaxial alignment with said push rod, said first element being a first clutch half, said second element being a second clutch half, said first and second clutch halves being movable against each other.

8. Apparatus in accordance with claim 1, wherein said pressure sensitive element comprises a non-positive friction clutch in co-axial arrangement with said push rod, said clutch having first and second clutch halves movable against each other, one of said clutch halves being articulated to said driven wheel and rotatably mounted, the other of said clutch halves being articulated to said housing.

9. Apparatus in accordance with claim 7, wherein said first clutch half acts upon said output rod.

10. Apparatus in accordance with claim 7, wherein said second clutch half acts upon said output rod.

11. Apparatus in accordance with claim 9, wherein said second clutch half is acted upon by said input rod.

12. Apparatus in accordance with claim 7, wherein said driven wheel comprises first and second portions in axial alignment, said first portion being coupled to said drive means and said second portion carries said screw joint means.

13. Apparatus in accordance with claim 12, wherein said first clutch half comprises a bell adapted to engage driven wheel second portion.

14. Apparatus in accordance with claim 13, wherein said screw joint means is disposed inside said bell between said drive wheel second portion and said first clutch half.

15. Apparatus in accordance with claim 13 further comprising a stud coupled to said input rod extending into said driven wheel second portion and coupled to said first clutch half.

16. Apparatus in accordance with claim 15, wherein said first clutch half includes a first flange, said second clutch half includes a second flange, and said friction clutch includes a friction lining disposed between said first and second flanges.

17. Apparatus in accordance with claim 16, wherein said driven wheel second portion includes longitudinal slots and said first clutch half extends through said longitudinal slots to act upon said output rod.

18. Apparatus in accordance with claim 8, wherein said clutch comprises friction linings disposed between said first and second clutch halves, said friction linings and said first and said first and second clutch halves being disposed inside said driven wheel.

19. Apparatus in accordance with claim 8, wherein said clutch comprises:
two clutch disks carried by said first clutch half, said two clutch disks being axially displaceable towards each other such that said two clutch disks are protected against twisting towards each other; and a disk carried by said second clutch half and extending between said two clutch disks;
one of said two clutch disks acting upon said output rod and the other of said two clutch disks being acted upon by said output rod.

20. Apparatus in accordance with claim 19, wherein each of said two clutch disks includes axial guides and said two clutch disks are coupled together by roller bodies disposed in said axial guides.

21. Apparatus in accordance with claim 20 comprising a bushing member connected to said housing; and wherein said second clutch half includes a spindle engaging said bushing member.

22. Apparatus in accordance with claim 21, wherein said spindle is coupled to said disk in at least one direction of rotation and in said axial direction operates on said disk, said two clutch disks and said output rod.

23. Apparatus in accordance with claim 1, wherein said drive means comprises an electric motor;
said pressure sensitive means comprises an electronic pressure sensor;
and said apparatus comprises:
electronic circuit means responsive to said pressure sensor for controlling said motor such that the torque provided by said motor is proportional to the pressure sensed by said sensor.

24. Apparatus in accordance with claim 23 comprising:
joint means for directly coupling said driven wheel to said output rod in at least one direction of rotation.

25. Apparatus in accordance with claim 24, wherein said electric motor has a rotor supported on said output rod.

26. Apparatus in accordance with claim 25, wherein said electric motor includes at least one stationary coil which acts upon an armature with at least two permanently excited magnetic poles.

* * * * *